United States Patent
Abe

(10) Patent No.: US 12,436,304 B2
(45) Date of Patent: Oct. 7, 2025

(54) RADIATION IMAGING SYSTEM

(71) Applicant: CANON KABUSHIKI KAISHA, Tokyo (JP)

(72) Inventor: Masashi Abe, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 184 days.

(21) Appl. No.: 18/516,378

(22) Filed: Nov. 21, 2023

(65) Prior Publication Data

US 2024/0176035 A1     May 30, 2024

(30) Foreign Application Priority Data

Nov. 28, 2022   (JP) ................................ 2022-188826

(51) Int. Cl.
*G01T 1/29*     (2006.01)
*G01T 1/17*     (2006.01)

(52) U.S. Cl.
CPC .............. *G01T 1/2992* (2013.01); *G01T 1/17* (2013.01)

(58) Field of Classification Search
CPC ................................. G01T 1/17; G01T 1/2992
See application file for complete search history.

(56) References Cited

U.S. PATENT DOCUMENTS

| | | | | |
|---|---|---|---|---|
| 6,333,963 B1 * | 12/2001 | Kaifu | ..................... | H04N 23/30 378/98.2 |
| 6,529,618 B1 * | 3/2003 | Ohara | ...................... | G06T 5/20 382/141 |
| 7,362,916 B2 * | 4/2008 | Yamazaki | .............. | H04N 23/30 348/E5.081 |
| 8,564,673 B2 * | 10/2013 | Omi | ....................... | G09G 3/006 348/207.99 |
| 8,797,430 B2 * | 8/2014 | Omi | ....................... | H04N 23/30 348/333.04 |
| 9,538,969 B2 * | 1/2017 | Nishii | .................... | A61B 6/542 |
| 10,201,323 B2 * | 2/2019 | Tanaka | .................. | A61B 6/465 |
| 10,206,642 B2 * | 2/2019 | Hiroike | ................... | A61B 6/54 |
| 10,545,435 B2 * | 1/2020 | Uchiyama | .......... | G03G 15/2039 |
| 10,695,024 B2 * | 6/2020 | Miyamoto | ............ | H04N 25/41 |
| 10,722,199 B2 * | 7/2020 | Hiroike | .................. | A61B 6/461 |
| 10,817,993 B2 * | 10/2020 | Takahashi | .............. | G01N 23/04 |

(Continued)

FOREIGN PATENT DOCUMENTS

JP     2016097195 A     5/2016

*Primary Examiner* — Blake C Riddick
(74) *Attorney, Agent, or Firm* — Canon U.S.A., Inc. IP Division

(57) ABSTRACT

A radiation imaging system includes a radiation imaging apparatus configured to generate a radiation image based on radiation emitted from a radiation generation apparatus, and a control apparatus configured to acquire information from the radiation imaging apparatus and the radiation generation apparatus. The control apparatus includes an image determination unit configured to determine whether the radiation image acquired from the radiation imaging apparatus is a failed image, an irradiation information acquisition unit configured to acquire irradiation information from the radiation generation apparatus, and a factor determination unit configured to determine a factor in acquisition of the failed image, based on a determination result of the image determination unit and information in the irradiation information acquisition unit.

9 Claims, 10 Drawing Sheets

(56) References Cited

U.S. PATENT DOCUMENTS

| | | | |
|---|---|---|---|
| 2001/0033678 A1* | 10/2001 | Hirai | H04N 1/4076 382/128 |
| 2002/0001366 A1* | 1/2002 | Tamura | A61B 6/06 378/154 |
| 2004/0151277 A1* | 8/2004 | Ohara | A61B 6/588 378/37 |
| 2004/0252874 A1* | 12/2004 | Yamazaki | H04N 25/68 348/E5.081 |
| 2006/0091390 A1* | 5/2006 | Morii | H10F 39/189 257/59 |
| 2006/0233565 A1* | 10/2006 | Tamaoki | G03G 15/2039 399/96 |
| 2009/0021607 A1* | 1/2009 | Takenaka | H04N 25/30 348/E5.031 |
| 2009/0189079 A1* | 7/2009 | Ohta | G03B 42/02 250/361 R |
| 2009/0189098 A1* | 7/2009 | Ohta | A61B 6/4283 250/522.1 |
| 2010/0061616 A1* | 3/2010 | Tsubota | A61B 6/586 382/132 |
| 2010/0187410 A1* | 7/2010 | Lijima | H04N 25/671 250/252.1 |
| 2010/0207032 A1* | 8/2010 | Tsubota | G01T 1/17 250/370.09 |
| 2011/0026677 A1* | 2/2011 | Konishi | A61B 6/583 378/98.12 |
| 2011/0063469 A1* | 3/2011 | Omi | H04N 5/32 348/222.1 |
| 2011/0110497 A1* | 5/2011 | Nishino | A61B 6/4283 378/116 |
| 2011/0235940 A1* | 9/2011 | Pavkovich | H04N 25/683 382/275 |
| 2012/0018640 A1* | 1/2012 | Shimizukawa | A61B 6/4464 250/354.1 |
| 2012/0018641 A1* | 1/2012 | Watanabe | A61B 6/4233 250/354.1 |
| 2012/0020541 A1* | 1/2012 | Hayashida | A61B 6/583 382/275 |
| 2012/0044392 A1* | 2/2012 | Takenaka | A61B 6/00 348/246 |
| 2012/0211666 A1* | 8/2012 | Amitani | H04N 23/30 250/394 |
| 2013/0068955 A1* | 3/2013 | Matsuura | H04N 23/30 250/371 |
| 2013/0082186 A1* | 4/2013 | Tajima | H04N 23/30 250/394 |
| 2013/0083897 A1* | 4/2013 | Ohta | A61B 6/548 378/91 |
| 2013/0121464 A1* | 5/2013 | Tajima | A61B 6/548 378/97 |
| 2013/0148782 A1* | 6/2013 | Tajima | A61B 6/548 378/62 |
| 2013/0223592 A1* | 8/2013 | Sato | H04N 25/30 378/97 |
| 2013/0279657 A1* | 10/2013 | Hiroike | H05G 1/08 378/91 |
| 2014/0029721 A1* | 1/2014 | Niwa | H04N 25/771 378/62 |
| 2014/0072103 A1* | 3/2014 | Kitano | A61B 6/542 378/62 |
| 2014/0079185 A1* | 3/2014 | Omi | G01N 23/04 348/246 |
| 2014/0084175 A1* | 3/2014 | Ito | H04N 23/30 250/370.09 |
| 2014/0110595 A1* | 4/2014 | Iwakiri | G01T 1/16 250/394 |
| 2014/0119509 A1* | 5/2014 | Kaneko | A61B 6/4233 378/62 |
| 2014/0124678 A1* | 5/2014 | Yoneyama | H04N 25/63 250/393 |
| 2014/0205066 A1* | 7/2014 | Kitagawa | H04N 23/30 378/62 |
| 2014/0211922 A1* | 7/2014 | Kuwabara | A61B 6/56 378/97 |
| 2014/0219422 A1* | 8/2014 | Nishino | H04N 23/30 378/62 |
| 2014/0239188 A1* | 8/2014 | Tezuka | G01T 1/17 250/394 |
| 2014/0252243 A1* | 9/2014 | Ohguri | H04N 25/30 250/394 |
| 2014/0254758 A1* | 9/2014 | Saigusa | A61B 6/548 378/62 |
| 2014/0254760 A1* | 9/2014 | Hiroike | A61B 6/54 378/62 |
| 2014/0254765 A1* | 9/2014 | Asai | A61B 6/5258 378/98.2 |
| 2015/0055752 A1* | 2/2015 | Takahashi | H04N 25/67 378/91 |
| 2015/0055753 A1* | 2/2015 | Tajima | A61B 6/4283 378/62 |
| 2015/0071414 A1* | 3/2015 | Oda | A61B 6/467 378/207 |
| 2015/0078528 A1* | 3/2015 | Okada | A61B 6/542 378/97 |
| 2015/0153464 A1* | 6/2015 | Imamura | H04N 23/30 378/207 |
| 2015/0164458 A1* | 6/2015 | Tajima | H05G 1/38 378/97 |
| 2015/0189194 A1* | 7/2015 | Tajima | H04N 5/32 378/62 |
| 2015/0245807 A1* | 9/2015 | Tajima | A61B 6/5294 378/98 |
| 2015/0310597 A1* | 10/2015 | Ohguri | A61B 6/00 382/275 |
| 2015/0363926 A1* | 12/2015 | Enomoto | A61B 6/5205 382/132 |
| 2016/0029986 A1* | 2/2016 | Nishii | A61B 6/4233 250/394 |
| 2016/0110850 A1* | 4/2016 | Tsuji | G06T 5/70 378/62 |
| 2016/0143602 A1* | 5/2016 | Hiroike | A61B 6/5258 378/91 |
| 2016/0157810 A1* | 6/2016 | Tezuka | A61B 6/56 378/91 |
| 2016/0198555 A1* | 7/2016 | Takahashi | H04N 25/30 378/91 |
| 2016/0220217 A1* | 8/2016 | Uchiyama | A61B 6/52 |
| 2017/0164916 A1* | 6/2017 | Kosuge | A61B 6/465 |
| 2017/0272670 A1* | 9/2017 | Tezuka | H04N 25/63 |
| 2018/0031714 A1* | 2/2018 | Tajima | A61B 6/4233 |
| 2018/0095183 A1* | 4/2018 | Takeshima | G01T 1/2992 |
| 2018/0140268 A1* | 5/2018 | Hiroike | A61B 6/4283 |
| 2018/0153496 A1* | 6/2018 | Sasaki | A61B 6/542 |
| 2018/0348378 A1* | 12/2018 | Kobayashi | A61B 6/4208 |
| 2019/0219711 A1* | 7/2019 | Kosuge | H04N 23/30 |
| 2019/0235093 A1* | 8/2019 | Tanaka | A61B 6/00 |
| 2019/0257956 A1* | 8/2019 | Ishii | H04N 25/68 |
| 2019/0391629 A1* | 12/2019 | Yokoyama | G01T 1/175 |
| 2020/0018710 A1* | 1/2020 | Tezuka | G01N 23/02 |
| 2020/0077036 A1* | 3/2020 | Koeda | H04N 5/3205 |
| 2020/0120783 A1* | 4/2020 | Kuwata | A61B 6/542 |
| 2020/0205767 A1* | 7/2020 | Niwa | A61B 6/487 |
| 2020/0252562 A1* | 8/2020 | Umekawa | A61B 6/586 |
| 2020/0292474 A1* | 9/2020 | Hayashida | G01N 23/04 |
| 2021/0067711 A1* | 3/2021 | Tezuka | G01T 1/2014 |
| 2021/0149064 A1* | 5/2021 | Masuda | G01T 1/17 |
| 2021/0196223 A1* | 7/2021 | Matsuda | G06T 5/70 |
| 2021/0204901 A1* | 7/2021 | Matsuda | A61B 6/545 |
| 2021/0251586 A1* | 8/2021 | Oda | A61B 6/4233 |
| 2021/0251593 A1* | 8/2021 | Oda | H04N 25/618 |
| 2021/0275127 A1* | 9/2021 | Oda | G01N 23/04 |
| 2021/0378615 A1* | 12/2021 | Kitano | A61B 6/545 |
| 2021/0383542 A1* | 12/2021 | Kitano | A61B 6/0492 |
| 2022/0058800 A1* | 2/2022 | Ito | G06T 7/0012 |
| 2023/0165550 A1* | 6/2023 | Shimizukawa | A61B 6/542 378/62 |

* cited by examiner

RADIATION IMAGING SYSTEM

BACKGROUND OF THE DISCLOSURE

Field of the Disclosure

The present disclosure relates to a radiation imaging system that captures a medical image and displays the captured medical image, and to a method of determining a factor of an imaging failure in medical image capturing.

Description of the Related Art

In recent years, radiation imaging systems have been used in various fields, and in particular, this type of system has been one of the important means for diagnoses in the medical field. In a radiation imaging system in the medical field, an object is irradiated with radiation emitted by a radiation generation apparatus, a radiation imaging apparatus generates a radiation image by accumulating the radiation that has passed through the object, and the radiation image is displayed on a display device after being subjected to processing, such as image processing in a control apparatus.

A radiation generation apparatus typically has signal connections to a control apparatus and a radiation imaging apparatus, and the radiation imaging apparatus operates to accumulate radiation in response to irradiation start and end notifications from the radiation generation apparatus. The generation and irradiation of radiation by the radiation generation apparatus are performed at the press of a radiation exposure switch by an operator.

When an object is imaged by such an imaging system and a captured digital radiation image is acquired, the acquired image can be a failed image. Failed images are caused by various factors (such as a case where radiation has not been normally emitted by the radiation generation apparatus). There are cases where re-imaging is necessary when such an image based on detection of insufficient radiation (hereinafter, such an image may be referred to as a dark image) is displayed on the display device.

In recent years, as a method of controlling an imaging system at the time of imaging failure, there has been a control method having the following configuration. In Japanese Patent Application Laid-Open No. 2016-97195, whether imaging is successful, such as whether an intended imaging object is included, is determined from an obtained captured digital radiation image, and if the imaging is determined to be unsuccessful, a screen for transitioning to re-imaging is displayed, so that the time and action taken before re-imaging can be reduced.

However, in the control method for a radiation imaging apparatus discussed in Japanese Patent Application Laid-Open No. 2016-97195, even if an imaging failure is determined and transition to re-imaging occurs, the factor of the imaging failure is not clear, and an operator cannot recognize what to do at the time of re-imaging, so that imaging can fail again.

SUMMARY OF THE DISCLOSURE

The present disclosure is directed to determining a factor in transfer of a dark image, based on information (hereinafter referred to as irradiation information) including radiation dose information notified to a control apparatus by a radiation generation apparatus, when an image transferred from a radiation imaging apparatus is the dark image (a failed image).

According to an aspect of the present disclosure, a radiation imaging system includes a radiation imaging apparatus configured to generate a radiation image based on radiation emitted from a radiation generation apparatus, and a control apparatus configured to acquire information from the radiation imaging apparatus and the radiation generation apparatus. The control apparatus includes an image determination unit configured to determine whether the radiation image acquired from the radiation imaging apparatus is a failed image, an irradiation information acquisition unit configured to acquire irradiation information from the radiation generation apparatus, and a factor determination unit configured to determine a factor in acquisition of the failed image, based on a determination result of the image determination unit and information in the irradiation information acquisition unit.

Further features of the present disclosure will become apparent from the following description of exemplary embodiments with reference to the attached drawings.

DESCRIPTION OF THE EMBODIMENTS

Embodiments of the present disclosure will be described below with reference to the drawings.

The present disclosure is not limited to exemplary embodiments specifically described, and various changes and modifications can be made without departing from the scope of claims.

<Hardware Configuration of Radiation Imaging System>

A hardware configuration of a system according to a first exemplary embodiment will be described with reference to FIG. 1.

Figure 1:
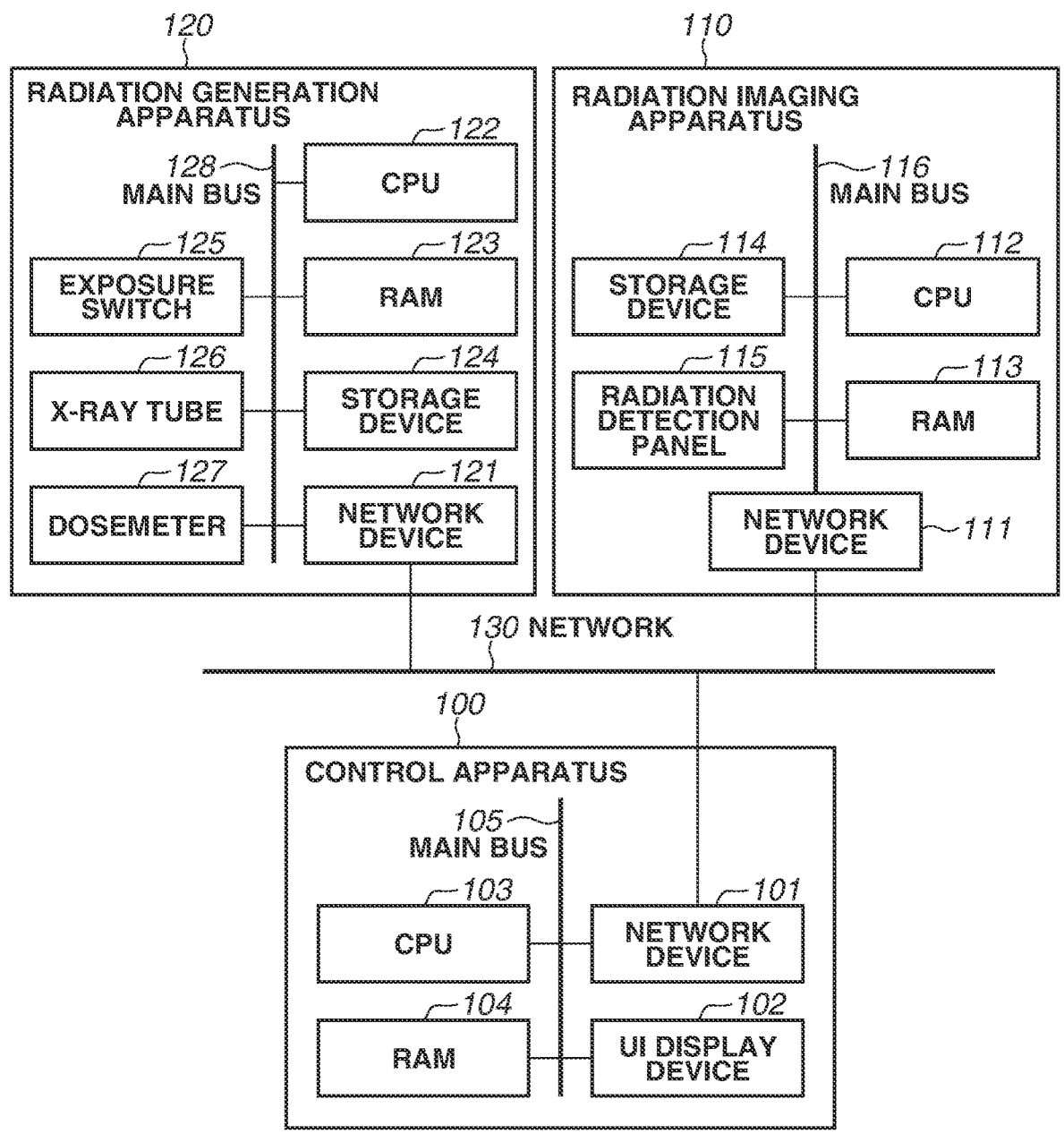
FIG. 1 is a diagram illustrating a hardware configuration of a radiation imaging system according to a first exemplary embodiment.

FIG. 1 illustrates an example of a hardware configuration of a radiation imaging system according to the present exemplary embodiment. This system includes a control apparatus 100, a radiation imaging apparatus 110, and a radiation generation apparatus 120 that are interconnected via a network 130. The network 130 may be either a wired network or a wireless network. The control apparatus 100 and the radiation imaging apparatus 110 form a subsystem. The radiation generation apparatus 120 is not a requirement in the subsystem, and the subsystem is formed as long as irradiation information to be described below can be obtained from the radiation generation apparatus 120.

The control apparatus 100 is an apparatus built in an information processing apparatus, such as a computer, and communicates with the radiation imaging apparatus 110 to control radiation imaging. The control apparatus 100 also communicates with the radiation generation apparatus 120 to acquire irradiation information from the radiation generation apparatus 120 at the time of irradiation of radiation. In this way, the control apparatus 100 can acquire various kinds of information about imaging from the radiation imaging apparatus 110 and the radiation generation apparatus 120.

The control apparatus 100 includes a network device 101 that connects to the network 130, and a user interface (UI) display device 102 that displays a radiation image.

The control apparatus 100 further includes a central processing unit (CPU) 103 that controls the entire apparatus, and a random access memory (RAM) 104 that provides a work space for the CPU 103.

The control apparatus 100 performs image processing on digital radiation image data received from the radiation imaging apparatus 110. The control apparatus 100 displays a radiation image based on the radiation image data subjected to the image processing, on the UI display device 102. The control apparatus 100 functions as an image processing apparatus and a display device control apparatus.

The radiation generation apparatus 120 is an apparatus that detects a radiation irradiation instruction by an exposure switch 125, and generates radiation from an X-ray tube 126.

Further, the radiation generation apparatus 120 includes a network device 121 that connects to the network 130, a CPU 122 that controls the entire apparatus, a RAM 123 that provides a work space for the CPU 122, and a storage device 124 that stores control programs and the like.

A dosemeter 127 is a measurement unit disposed between the X-ray tube 126 and the radiation imaging apparatus 110 to measure the radiation dose of an X-ray emitted in imaging, and is disposed, for example, in front of the X-ray tube 126. The dosemeter 127 is, for example, an area dosemeter, and measures an area dose over a predetermined period.

Here, all the devices of the radiation generation apparatus 120 are connected via a main bus 128, and can transmit and receive data to and from each other.

The radiation imaging apparatus 110 communicates with the radiation generation apparatus 120, and controls the start and end of radiation irradiation. The irradiated radiation passes through a subject and is incident on the radiation imaging apparatus 110. After converting the incident radiation into visible light, the radiation imaging apparatus 110 detects the visible light as a radiation electric signal using a photoelectric conversion element.

The radiation imaging apparatus 110 reads out the radiation electric signal by driving the photoelectric conversion element, and obtains digital radiation image data by converting the analog signal to a digital signal using an analog-to-digital (A/D) converter. The obtained digital radiation image data is transferred from the radiation imaging apparatus 110 to the control apparatus 100.

A method of controlling the end of radiation may be a method using an automatic exposure control function that detects a part of radiation that has passed through a subject by a light field, converts the detected radiation into an electric signal, and stops the radiation when an integrated value of this electric signal reaches a target value. In this case, the target value is set as a stop condition for stopping radiation, and a signal indicating an instruction to stop radiation is transmitted to the radiation generation apparatus 120, based on a pixel value (an integrated value of an electric signal of a photoelectric conversion element) of a target region to be described below, and this stop condition setting. The automatic exposure control function will be referred to below as automatic exposure control (AEC). The radiation imaging apparatus 110 includes a network device 111, a CPU 112, a RAM 113, and a storage device 114, which similar to those of the above-described hardware configurations of the control apparatus 100 and the radiation generation apparatus 120, and thus the description thereof will be omitted. A radiation detection panel 115 will be described with reference to FIG. 2.

The radiation detection panel 115 will now be described with reference to FIG. 2. The radiation detection panel 115 includes a support substrate 300 where a pixel array 228 is disposed, a drive circuit 226, a readout circuit 227, and an imaging apparatus control unit 225. The pixel array 228 includes a plurality of pixels arranged in a matrix. The plurality of pixels includes a first pixel 301 and a second pixel 321.

The first pixel 301 includes a conversion element 302 that converts incident radiation or light into electric charge corresponding to the amount of the incident radiation or light, and a switch element 303 that outputs the electric charge generated by the conversion element 302 to a signal line, in order to acquire a radiation image. The conversion element 302 may be, for example, an indirect conversion element using a scintillator that converts radiation into light, and a photoelectric conversion element that converts the light converted by the scintillator into electric charge. Further, for example, a direct conversion element that directly converts radiation into electric charge may be used as the conversion element 302. As the switch element 303, for example, a thin film transistor (TFT) using amorphous silicon or polysilicon can be used. For example, polysilicon may be used depending on characteristics desired for the TFT. The semiconductor material to be used for the TFT is not limited to silicon, and other semiconductor materials, such as germanium and a compound semiconductor, may be used.

A first main electrode of the switch element 303 is electrically connected to a first electrode of the conversion element 302, and a bias line 108 is electrically connected to a second electrode of the conversion element 302. The bias line 108 is connected in common to the second electrode of each of the plurality of conversion elements 302 arranged in a column.

A common bias voltage is supplied to the bias line 108 disposed for each column. The bias line 108 receives the bias voltage from a power supply circuit.

A signal line 106 is electrically connected to a second main electrode of the switch element 303. The second main electrode of the switch element 303 of each of the pixels arranged in a column is connected in common to the signal line 106. The signal line 106 is disposed for each column of the pixels. Each of the signal lines 106 is electrically connected to the readout circuit 227. A drive line 304 is electrically connected to a control electrode of the switch element 303. The drive line 304 is connected in common to the control electrode of the switch element 303 of each of the plurality of first pixels 301 arranged in a row, and gate control voltages Vg1 to Vgn are applied from the drive circuit 226 to the drive lines 304.

The second pixel 321 includes a detection element 322 that converts incident radiation or light into electric charge corresponding to the amount of the incident radiation or light, and a switch element 323 that outputs the electric charge generated by the detection element 322 to a signal line, in order to acquire the total amount of the incident radiation during the irradiation of the radiation. The second pixel 321 may include the conversion element 302 and the switch element 303. The detection element 322 may have a configuration similar to the configuration of the conversion element 302, and the switch element 323 may have a configuration similar to the configuration of the switch element 303.

A first main electrode of the switch element 323 is electrically connected to a first electrode of the detection element 322, and the bias line 108 disposed for each column is electrically connected to a second electrode of the detection element 322. A second main electrode of each of the switch elements 323 arranged in a column is connected to a detection line 310. Each of the detection lines 310 is electrically connected to the readout circuit 227. A drive line 324 disposed for each row is connected to a control electrode of the switch element 323. Gate control voltages Vd1 to Vdn are applied from the drive circuit 226 to the drive lines 324.

Figure 2:
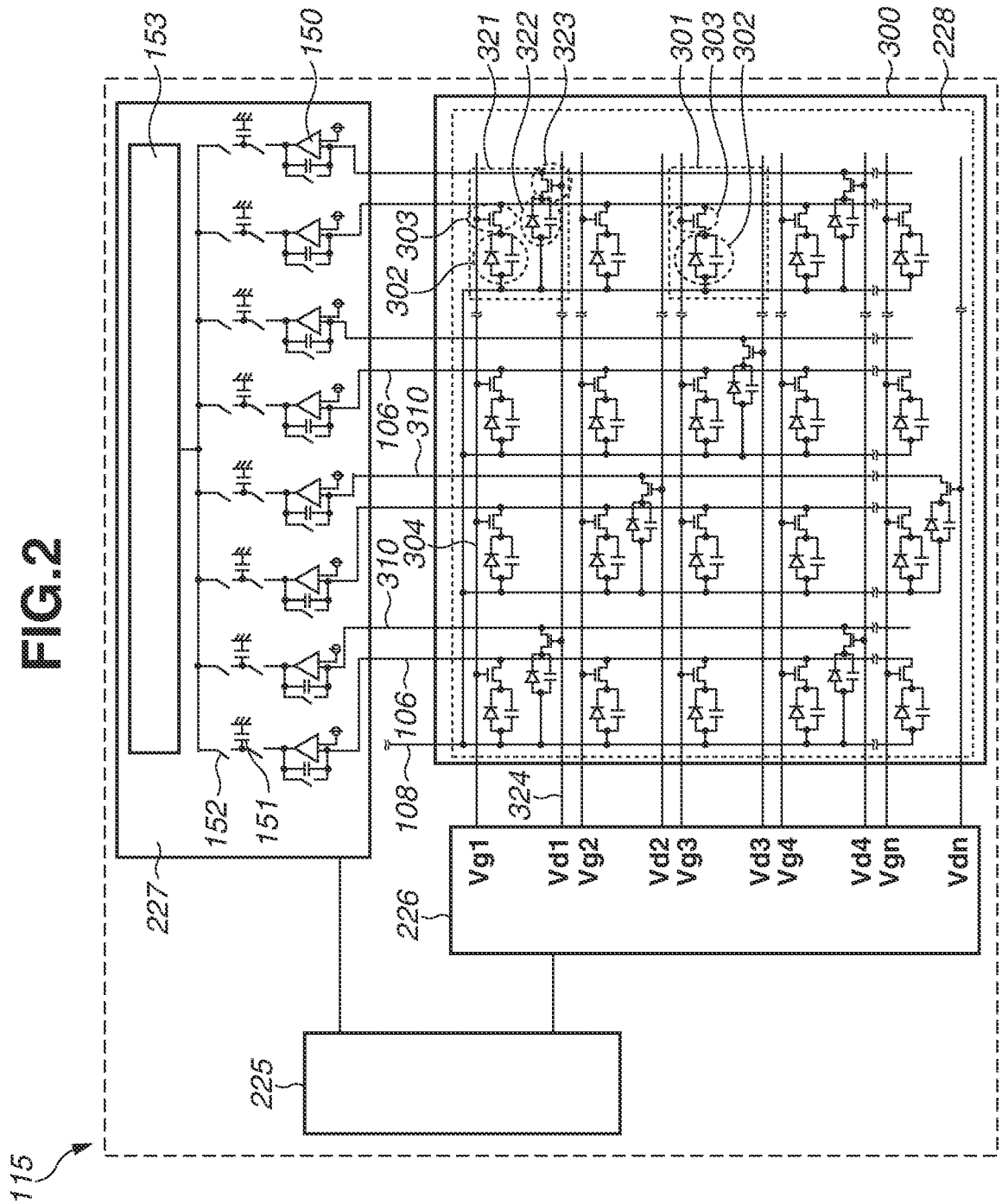
FIG. 2 is a diagram illustrating a hardware configuration of a radiation imaging apparatus according to the first exemplary embodiment.

The second pixel 321 may be arranged as each of a plurality of pixels in an imaging region as illustrated in FIG. 2, or may be arranged as only one pixel, for example. If the plurality of pixels 321 is arranged, an incident radiation dose may be detected by the detection element 322 of only one of the plurality of second pixels 321 arranged, or may be detected by the plurality of detection elements 322. The total amount of radiation incident from the pixel 301 may be acquired by driving the drive line 304 during the irradiation of the radiation, without disposing the second pixel 321.

Figure 3:
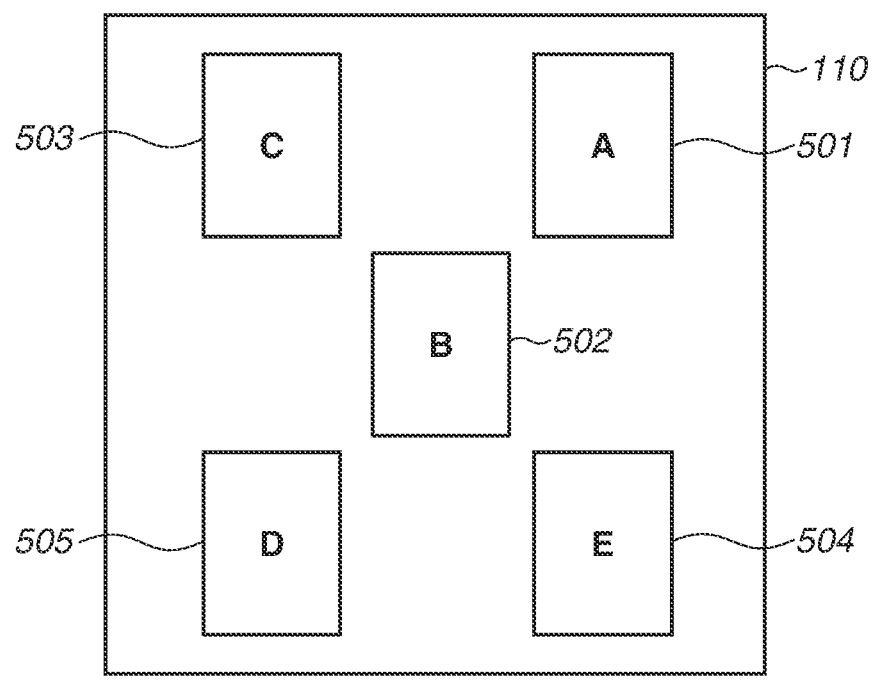
FIG. 3 is a diagram illustrating a light field arrangement according to the first exemplary embodiment.

The radiation imaging apparatus 110 can provide more light fields in a free arrangement, using such a structure. For example, five light fields 501 to 505 can be provided as illustrated in FIG. 3. This arrangement is merely an example, and light fields may be provided in any arrangement.

In the readout circuit 227, the signal line 106 and the detection line 310 are each connected to an inversion input terminal of an operation amplifier 150. The inversion input terminal of the operation amplifier 150 is connected to an output terminal via a feedback capacitor, and a non-inversion input terminal is connected to a fixed potential. The operation amplifier 150 functions as a charge-voltage conversion circuit. An AD converter 153 after the operation amplifier 150 is connected via a sample-and-hold circuit 151 and a multiplexer 152. The readout circuit 227 forms a digital conversion circuit that converts electric charge transferred from each of the conversion element 302 of the first pixel 301 and the detection element 322 of the second pixel 321 via the signal line 106 and the detection line 310, into an electric signal that is a digital signal. The readout circuit 227 may be configured by integrating the circuits, or may be disposed individually for each of the circuits.

<Software Configuration of Radiation Imaging System>

Figure 4:
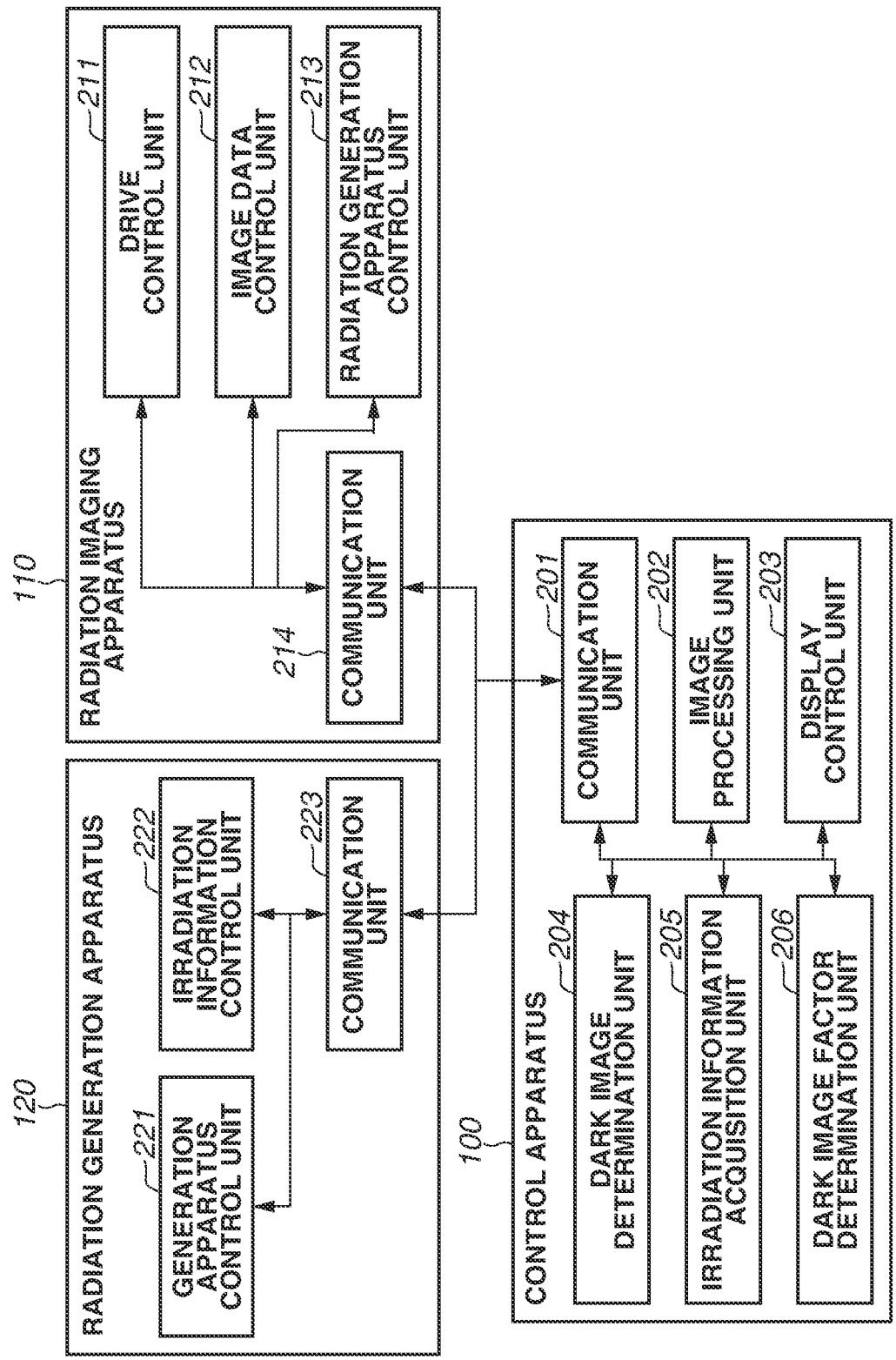
FIG. 4 is a diagram illustrating a software configuration of the radiation imaging system according to the first exemplary embodiment.

FIG. 4 illustrates an example of a software configuration of the radiation imaging system according to the present exemplary embodiment.

The radiation imaging apparatus 110 includes a drive control unit 211, an image data control unit 212, a radiation generation apparatus control unit 213, and a communication unit 214.

The drive control unit 211 controls the drive circuit 226 and the readout circuit 227, based on commands and the like from the control apparatus 100.

The radiation generation apparatus control unit 213 controls communication with the radiation generation apparatus 120 via the communication unit 214, based on information from the drive control unit 211.

When the radiation dose of a selected light field has reached a reference threshold, the radiation generation apparatus control unit 213 notifies a stop to the radiation generation apparatus 120 via the communication unit 214. If a plurality of light fields is selected as monitoring targets, for example, a mode in which a stop is notified when the radiation dose of any one of the selected light fields reaches the reference threshold may be used. Further, a mode in which a stop is notified when the radiation doses of all the selected light fields reach the reference threshold may be used.

The image data control unit 212 stores image data from the readout circuit 227, and controls communication with the control apparatus 100. The image data control unit 212 and the control apparatus 100 exchange radiation image data and control-related information (such as control commands).

The radiation generation apparatus 120 includes a generation apparatus control unit 221, an irradiation information control unit 222, and a communication unit 223.

The generation apparatus control unit 221 detects a radiation irradiation instruction of the exposure switch 125, and performs control for generating radiation from the X-ray tube 126.

The irradiation information control unit 222 manages setting information, such as an X-ray tube voltage and an X-ray tube current, and manages a radiation dose value measured by the dosemeter 127 in imaging.

The communication unit 223 performs communication by controlling the network device 121. Here, when the generation apparatus control unit 221 detects a radiation irradiation instruction of the exposure switch 125, the communication unit 223 issues an irradiation start notification to the radiation imaging apparatus 110. Afterward, upon receiving an irradiation permission notification from the radiation imaging apparatus 110, the generation apparatus control unit 221 performs control for generating radiation, and performs synchronous communication. In addition, the communication unit 223 transmits the irradiation information in the current imaging of the radiation generation apparatus 120, from the irradiation information control unit 222 to the control apparatus 100, when the irradiation is completed.

The control apparatus 100 includes a communication unit 201, an image processing unit 202, a display control unit 203, a dark image determination unit 204, an irradiation information acquisition unit 205, and a dark image factor determination unit 206. The dark image is one of the failed images, and the details of this image will be described below.

The communication unit 201 is a piece of software that performs communication by controlling the network device 101, and acquires irradiation information on the radiation generation apparatus 120, and acquires a radiation image from the radiation imaging apparatus 110.

The image processing unit 202 processes a captured radiation image acquired via the communication unit 201, and generates an image to be used in the control apparatus 100.

The display control unit 203 displays the image generated by the image processing unit 202 on the UI display device 102.

<Dark Image Determination Unit>

The dark image determination unit 204 determines whether an image transferred from the radiation imaging apparatus 110 to the control apparatus 100 is a dark image.

Figure 5:
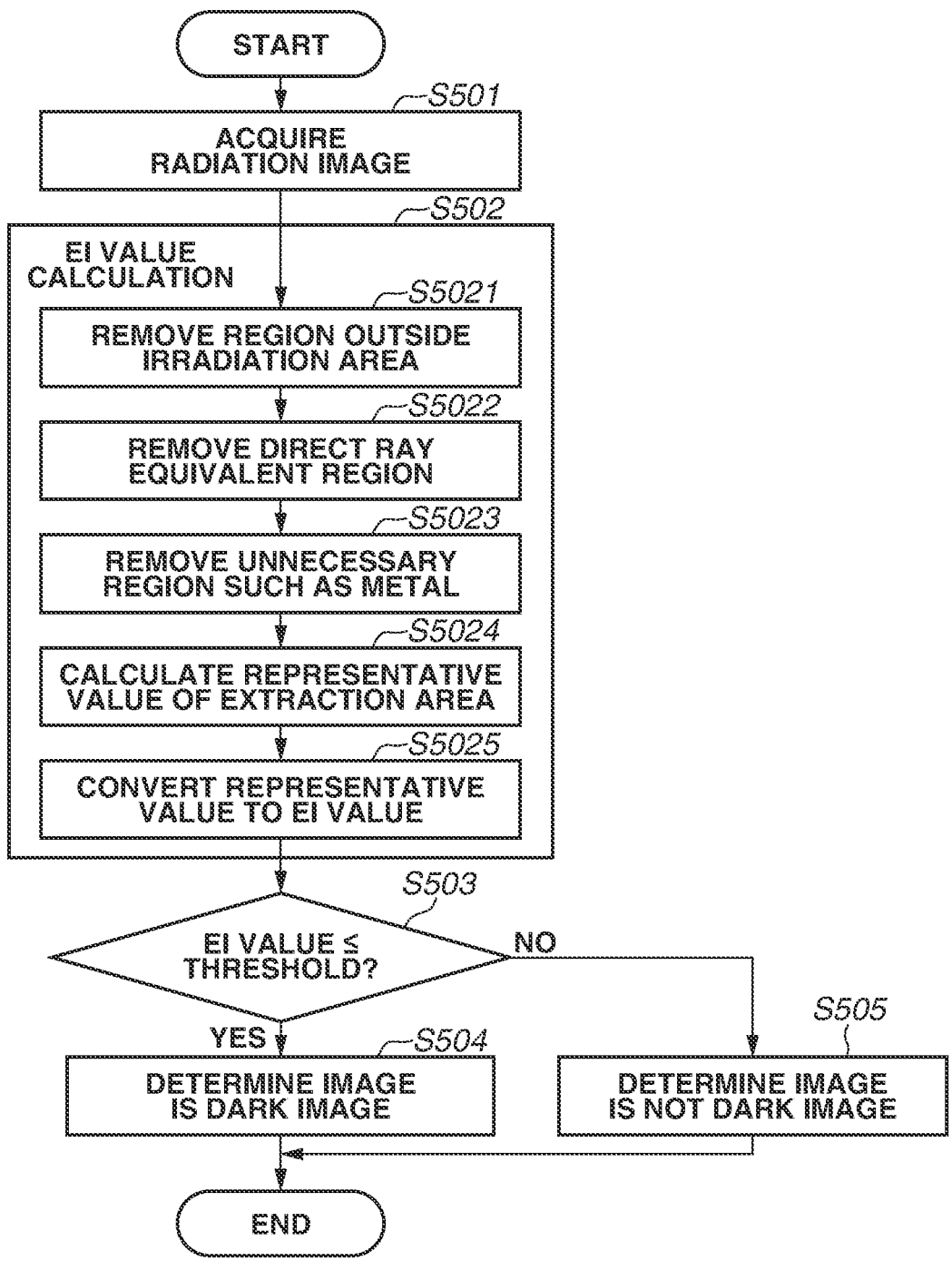
FIG. 5 is a flowchart illustrating dark image determination according to the first exemplary embodiment.

FIG. 5 illustrates a dark image determination procedure in the dark image determination unit 204. The dark image is a failed image generated when radiation generated from the radiation generation apparatus 120 does not sufficiently reach the radiation imaging apparatus 110, i.e., when imaging has failed because of an insufficient radiation dose. A failed image generated when imaging has failed because of no generation of radiation from the radiation generation apparatus 120 is also a dark image. The determination procedure by the dark image determination unit 204 will be described below.

First, in step S501, the dark image determination unit 204 acquires a radiation image from the radiation imaging apparatus 110 via the communication unit 201.

Next, in step S502, in order to determine whether the acquired radiation image is a dark image, the dark image determination unit 204 calculates a dose index value from the radiation image.

The dark image determination unit 204 determines a region for calculating the dose index value (an EI value), in the radiation image acquired in step S501. The number of regions may be one but may be two or more. In the present exemplary embodiment, the dark image determination unit 204 selects a target region, as the region for calculating the dose index value. The dose index value is, for example, an EI value.

While the EI value is used as the dose index in the present exemplary embodiment, a similar technique is applicable to the dose indexes in general.

Step S5021 to step S5025 exemplify a procedure for calculating the EI value from the image.

First, in step S5021, the dark image determination unit 204 excludes a region which is not irradiated with an X-ray and is apparently outside the target region of a diagnosis image, in the captured image, from an EI value calculation area, by using a "removal of region outside irradiation area" procedure. A method of calculating an area based on information, such as collimator information or a tube-to-flat panel detector (FPD) distance (FDD) information, a method of extracting an irradiation field from an image beforehand using information, such as information about each imaging part or an artificial intelligence (AI) determination method by machine learning, is used as the method.

Next, in step S5022, the dark image determination unit 204 excludes a region outside the target region from the EI value calculation area, by identifying a direct ray region by using a "removal of direct ray equivalent region" procedure. Examples of the method include an empirically fixed threshold method, a mode method, a differential histogram method, a p-tile method, and a discriminant analysis method.

Further, in step S5023, the dark image determination unit 204 excludes a low dose region that is within the target region but should not be used as a dose index of the target region for a normal diagnostic image, from the EI value calculation area, by using a "removal of unnecessary region, such as metal" procedure. Examples of the method include a region growth method, and a snake method. A dose index value determined beforehand by a dose index region determination unit (not illustrated) is applied to the region for calculation, or the processing up to this point is applied to the entire image, and subsequently, a region for EI value calculation is determined by clipping a region for calculating the dose index value determined by the dose index region determination unit (not illustrated). The removal of region outside irradiation area, the removal of direct ray equivalent region, and the removal of unnecessary region, such as metal, may each be selectively performed, or may be omitted.

Next, in step S5024, the dark image determination unit 204 calculates a representative value, such as an average value or a median value, by using a "calculation of representative value of extraction area" procedure.

Finally, in step S5025, the dark image determination unit 204 calculates an EI value by converting the representative value to 100=1 µGy, by using a "conversion of representative value to EI value" procedure.

In the present exemplary embodiment, the EI value is calculated for the region of each of the light fields for monitoring, from the received radiation image data.

This completes the procedure for calculating the EI value from the radiation image.

In step S503 to step S505, the dark image determination is performed based on the EI value calculated in step S502.

In the present exemplary embodiment, the image is determined as a dark image if the EI value is 100 or less in the regions of all light fields for monitoring.

<Irradiation Information Acquisition Unit>

The irradiation information acquisition unit 205 acquires irradiation information notified by the radiation generation apparatus 120 via the communication unit 201, and holds a radiation dose value included in the acquired irradiation information.

There is a case where the irradiation information is not notified by the radiation generation apparatus 120, even if the image processing by the image processing unit 202 and the processing of displaying a radiation image on the UI display device 102 by the display control unit 203 after the radiation image is transferred from the radiation imaging apparatus 110 are completed. In this case, the radiation dose value is held as null information.

<Dark Image Factor Determination Unit>

An example of the factor in the transfer of the dark image is a case where radiation is not emitted by the radiation generation apparatus because synchronization has failed for reasons, such as poor communication between the radiation generation apparatus and the radiation imaging apparatus. Other examples include a case where a sufficient dose of radiation for imaging is not emitted because an operator has quickly released the radiation exposure switch by mistake, and a case where radiation is emitted to a radiation imaging apparatus different from the radiation imaging apparatus in which radiation accumulation has started.

The method of dark image factor determination by the control apparatus 100 in the present exemplary embodiment will be described with reference to FIG. 6, and the configuration of a display screen in the dark image factor determination will be described with reference to FIG. 7.

The dark image factor determination unit 206 determines the factor in the transfer of the dark image from the radiation imaging apparatus 110, based on the determination result of the dark image determination unit 204, and the radiation dose value held in the irradiation information acquisition unit 205.

Figure 6:
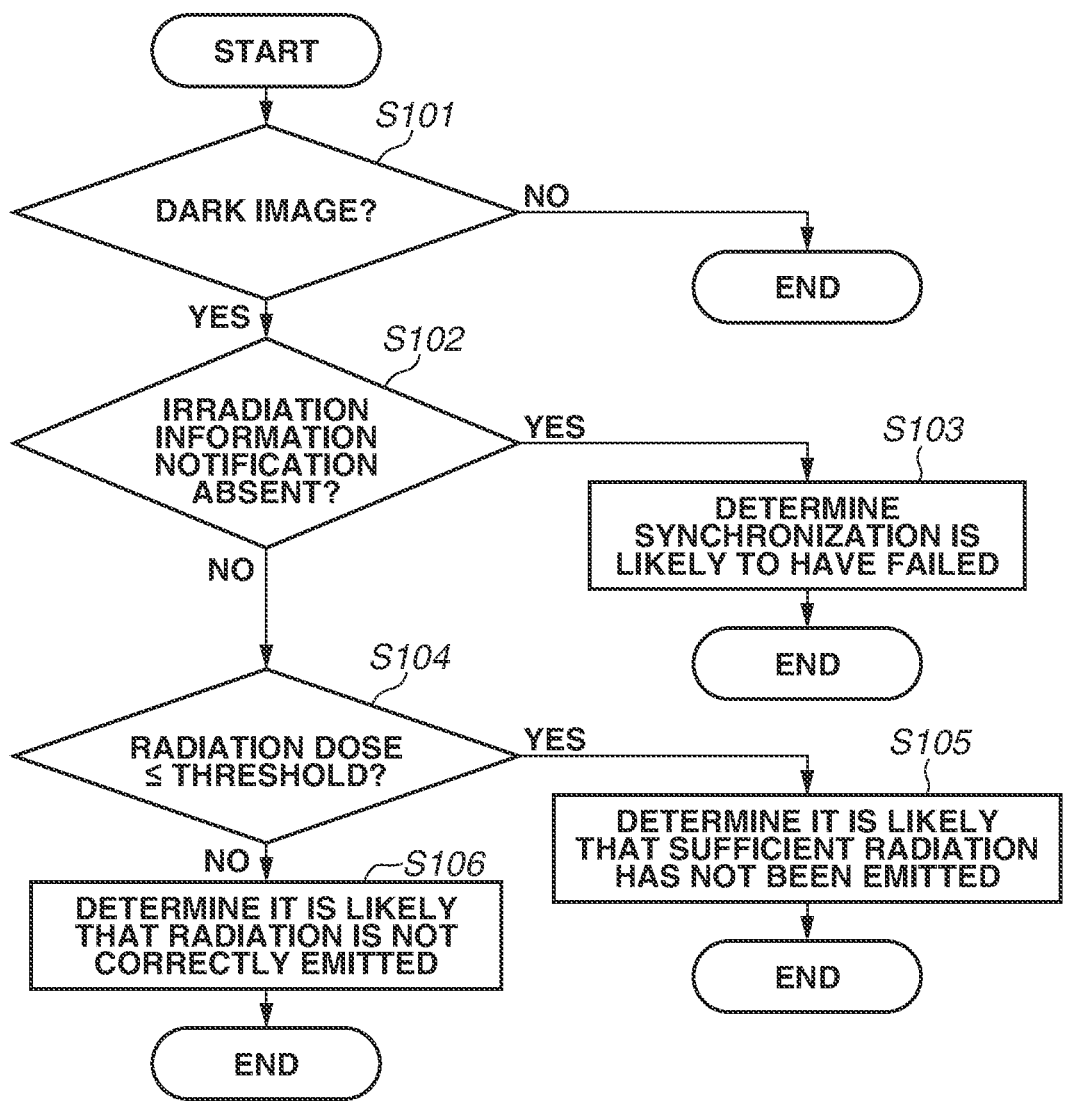
FIG. 6 is a flowchart illustrating dark image factor determination according to the first exemplary embodiment.

FIG. 6 is a flowchart illustrating the dark image factor determination. The dark image factor determination starts after the determination by the dark image determination unit 204 and the information acquisition by the irradiation information acquisition unit 205 are completed.

In step S101, the dark image factor determination unit 206 acquires the result of the determination by the dark image determination unit 204, and determines whether the determination result indicates a dark image. If the determination result does not indicate a dark image (NO in step S101), the dark image factor determination unit 206 determines that imaging is normally performed, and the dark image factor determination ends. On the other hand, if the result of the determination by the dark image determination unit 204 indicates a dark image (YES in step S101), the processing proceeds to step S102, and the dark image factor determination continues.

In step S102, the dark image factor determination unit 206 acquires the radiation dose value held by the irradiation information acquisition unit 205, and determines whether the radiation dose value is null information. If the radiation dose value is null information, i.e., if notification of the irradiation information is absent (YES in step S102), the dark image factor is determined in step S103.

In step S103, the dark image is transferred from the radiation imaging apparatus 110, and the irradiation information is not notified by the radiation generation apparatus 120. For this reason, there is a high possibility that the synchronization between the radiation generation apparatus 120 and the radiation imaging apparatus 110 in imaging has failed. Specifically, the dark image factor determination unit 206 determines that it is likely that the synchronous communication has failed and that the radiation generation apparatus 120 has failed to emit an X-ray. Further, the dark image factor determination unit 206 displays the dark image determination result on the UI display device 102 via the display control unit 203, based on this determination result.

In step S104, the dark image factor determination unit 206 determines whether the radiation dose value held by the irradiation information acquisition unit 205 is less than or equal to a threshold set beforehand. If the radiation dose value is less than or equal to the threshold (YES in step S104), the dark image factor is determined in step S105. On the other hand, if the radiation dose value is more than the above-described threshold (NO in step S104), the dark image factor is determined in step S106. Here, a value that is significantly small compared with a radiation dose when imaging is normally performed is set as the threshold.

In step S105, the dark image is transferred from the radiation imaging apparatus 110, and the radiation dose value is less than or equal to the threshold. Thus, the dark image factor determination unit 206 determines it is likely that a sufficient dose of radiation for imaging has not been emitted since the operator has quickly released the radiation exposure switch by mistake. Further, the dark image factor determination unit 206 displays the dark image determination result on the UI display device 102 via the display control unit 203, based on this determination result.

In step S106, the dark image factor determination unit 206 determines it is likely that radiation has not been emitted to a desired radiation imaging apparatus. In other words, since the dark image is transferred from the radiation imaging apparatus 110 and the radiation dose value is more than the threshold, there is a high possibility that radiation emission to the desired radiation imaging apparatus that has started accumulation has failed. Thus, the dark image factor determination unit 206 displays the dark image determination result on the UI display device 102 via the display control unit 203, based on this determination result.

The radiation imaging system can have an imaging mode in which synchronous communication between the radiation generation apparatus and the radiation imaging apparatus is performed and an imaging mode in which radiation emitted at a timing is automatically detected without connection between the radiation generation apparatus and the radiation imaging apparatus. In this case, the dark image factor is determined in step S103 only if an imaging mode determination unit (not illustrated) of the control apparatus 100 determines that the former imaging mode is currently used.

Figure 7:
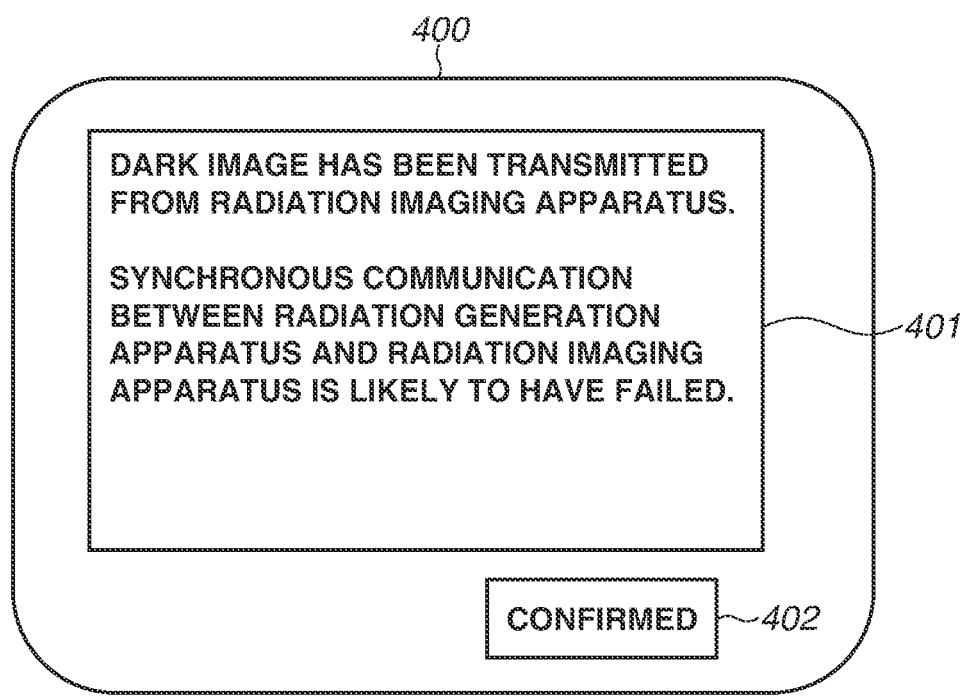
FIG. 7 is a diagram illustrating a configuration of a dark image factor determination result screen according to the first exemplary embodiment.

FIG. 7 illustrates an example of a configuration of a dark image factor determination result screen in the dark image factor determination.

A dark image factor determination result screen 400 includes a dark image factor determination result display region 401, and a confirmation button 402.

The result determined by the dark image factor determination unit 206 is displayed in the dark image factor determination result display region 401. The operator is thereby notified of information indicating that the dark image has been transferred to the control apparatus 100 and of the dark image factor determination result.

The confirmation button 402 is a button for the operator to press after confirming the dark image factor determination result, and to close the dark image factor determination result screen 400.

The dark image factor determination result screen 400 is not limited to the form of the present exemplary embodiment.

In other words, any form is applicable if means for notifying the operator of the dark image factor determination result is included.

When the image transferred from the radiation imaging apparatus 110 is a dark image, the control apparatus 100 determines a factor of the dark image based on irradiation information notified to the control apparatus 100 by the radiation generation apparatus 120 upon completion of emission, and displays the determined factor on the UI display device 102. This makes it easy for the operator to perform appropriate imaging in re-imaging.

A second exemplary embodiment will be described. In the configuration of the first exemplary embodiment, when a dark image is transferred from the radiation imaging apparatus 110 and irradiation information is not notified by the radiation generation apparatus 120, it is determined that there is a high possibility that the synchronous communication between the radiation generation apparatus 120 and the radiation imaging apparatus 110 has failed.

However, in this determination method, for example, if irradiation is not performed because of a malfunction of the radiation generation apparatus 120 and irradiation information is not notified, it can be erroneously determined that the synchronous communication between the radiation generation apparatus 120 and the radiation imaging apparatus 110 has failed.

In the second exemplary embodiment, a time-out of synchronous communication between a radiation generation apparatus 120 and a radiation imaging apparatus 110 is determined, and dark image factor determination is performed based on information indicating whether the synchronous communication has timed out. In other words, a factor of dark image generation is determined based on whether the synchronous communication is completed within a predetermined time. This makes it possible for an operator to recognize that the factor in the transfer of a dark image is poor communication between the radiation generation apparatus 120 and the radiation imaging apparatus 110.

Only a part different from the first exemplary embodiment will be described below with reference to FIG. 8 and FIG. 9.

Figure 8:
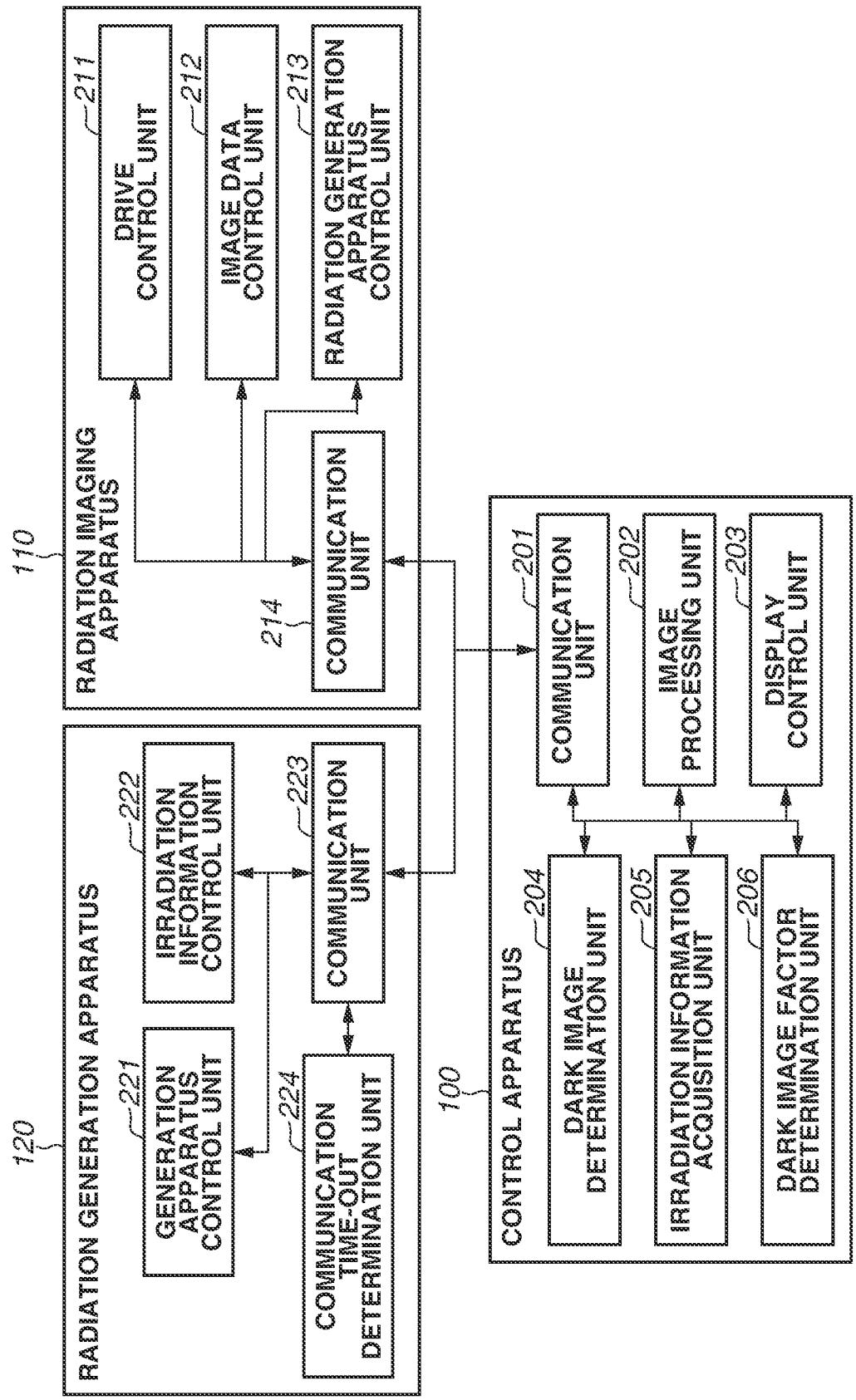
FIG. 8 is a diagram illustrating a hardware configuration of a radiation imaging system according to a second exemplary embodiment.

FIG. 8 is an example of a software configuration of a radiation imaging system according to the present exemplary embodiment.

The radiation generation apparatus 120 additionally includes a communication time-out determination unit 224.

The communication time-out determination unit 224 monitors the time from when an irradiation start notification is transmitted to the radiation imaging apparatus 110 by a generation apparatus control unit 221 until an irradiation permission notification is returned from the radiation imaging apparatus 110 after an exposure switch 125 is pressed. If the irradiation permission notification is not returned even though this monitored time has exceeded a fixed period of time, the communication time-out determination unit 224 determines that the synchronous communication has timed out. If the communication time-out determination unit 224 determines that the synchronous communication has timed out, the communication time-out determination unit 224 notifies a control apparatus 100 of the communication time-out via a communication unit 223.

In this configuration example, the radiation generation apparatus 120 includes the communication time-out determination unit 224, but an X-ray interface box may include this unit. The X-ray interface box is a piece of hardware that holds a circuit for mediating communication, and controls irradiation of radiation, imaging operation, and other operations by communicating with the radiation generation apparatus 120 and the radiation imaging apparatus 110.

Figure 9:
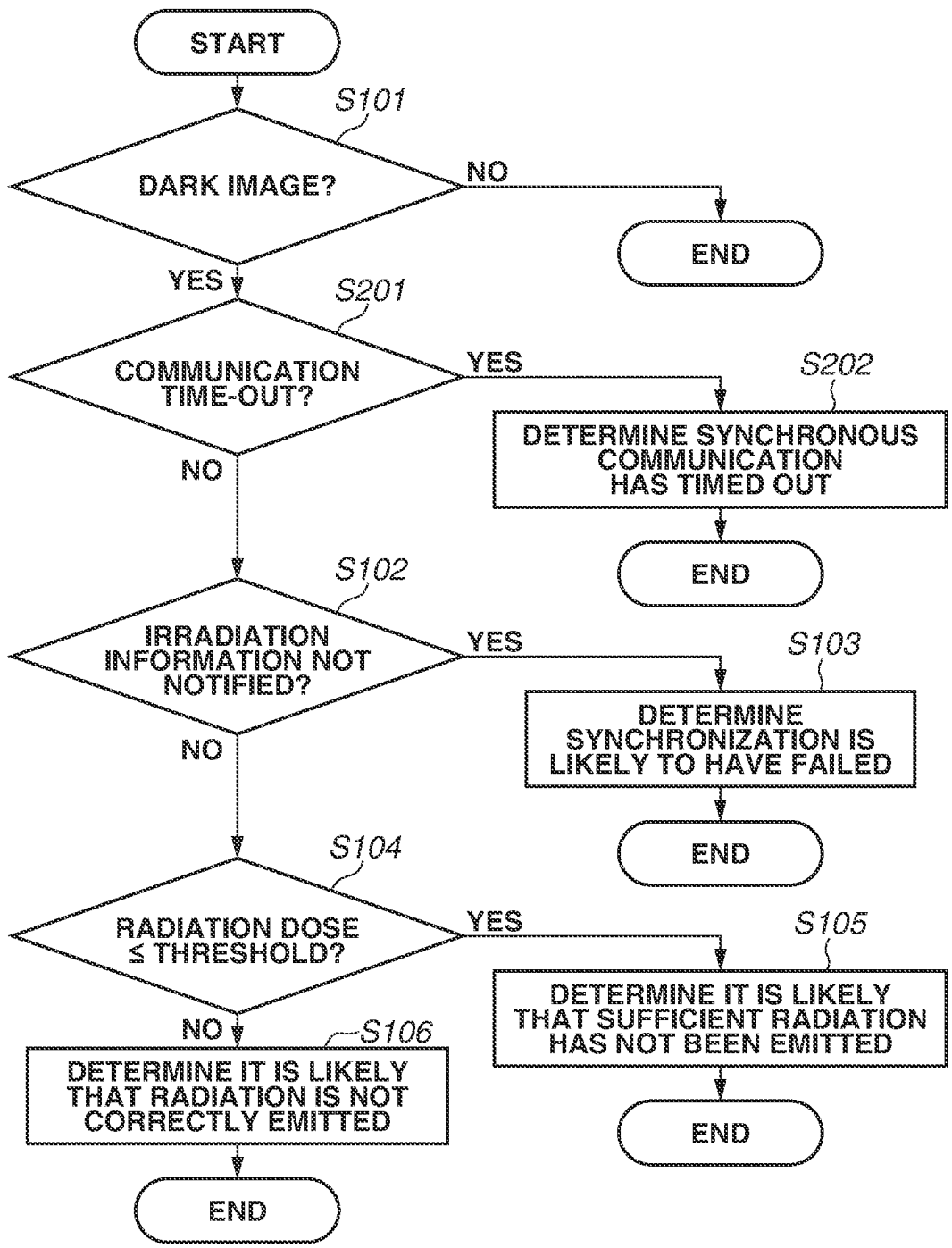
FIG. 9 is a flowchart illustrating dark image factor determination according to the second exemplary embodiment.

FIG. 9 is a flowchart illustrating the dark image factor determination according to the present exemplary embodiment.

When a dark image determination unit 204 determines that a transferred image is a dark image, step S201 is performed.

In step S201, a dark image factor determination unit 206 acquires a determination result notified by the communication time-out determination unit 224, and determines whether a communication time-out is notified. If the communication time-out is notified (YES in step S201), step S202 is performed, and the dark image factor determination unit 206 determines that the communication time-out is the dark image factor. The method of displaying the determination result on a UI display device is similar to the method according to the first exemplary embodiment.

If a communication time-out has not occurred (NO in step S201), the subsequent determination procedure is similar to the procedure according to the first exemplary embodiment.

As described above, in the second exemplary embodiment, when the image transferred from the radiation imaging apparatus 110 is a dark image, the control apparatus 100 performs the dark image factor determination based on the notification of the time-out of the communication between the radiation generation apparatus 120 and the radiation imaging apparatus 110. This makes it possible for the operator to recognize that the factor in the transfer of the dark image is poor synchronous communication.

A third exemplary embodiment will be described. In the configuration of the first exemplary embodiment, if a result of the determination in the dark image determination unit 204 does not indicate a dark image, the dark image factor determination unit 206 ends the dark image factor determination, and the determination result is not displayed on the UI display device.

However, if a transferred image is not a dark image, and irradiation information is not notified or the radiation dose is less than or equal to the threshold, there is a concern that the radiation imaging system is unlikely to be normally operating.

If the transferred image is not a dark image and the irradiation information is not notified, for example, there is a possibility that the communication between the control apparatus 100 and the communication with 120 is poor. Meanwhile, if the transferred image is not a dark image and the radiation dose is less than or equal to the threshold, for example, there is a possibility that dosimetry by the dosemeter 127 or the irradiation information control unit 222 is not correctly performed.

Thus, the control apparatus 100 can warn the operator that there is a possibility that the radiation imaging system is not normally operating based on the determination result indicating that the image is not a dark image in the dark image determination unit 204 and the irradiation information in the irradiation information acquisition unit 205.

This will be described in the third exemplary embodiment. Only a part different from the first exemplary embodiment will be described below with reference to FIG. 10.

Figure 10:
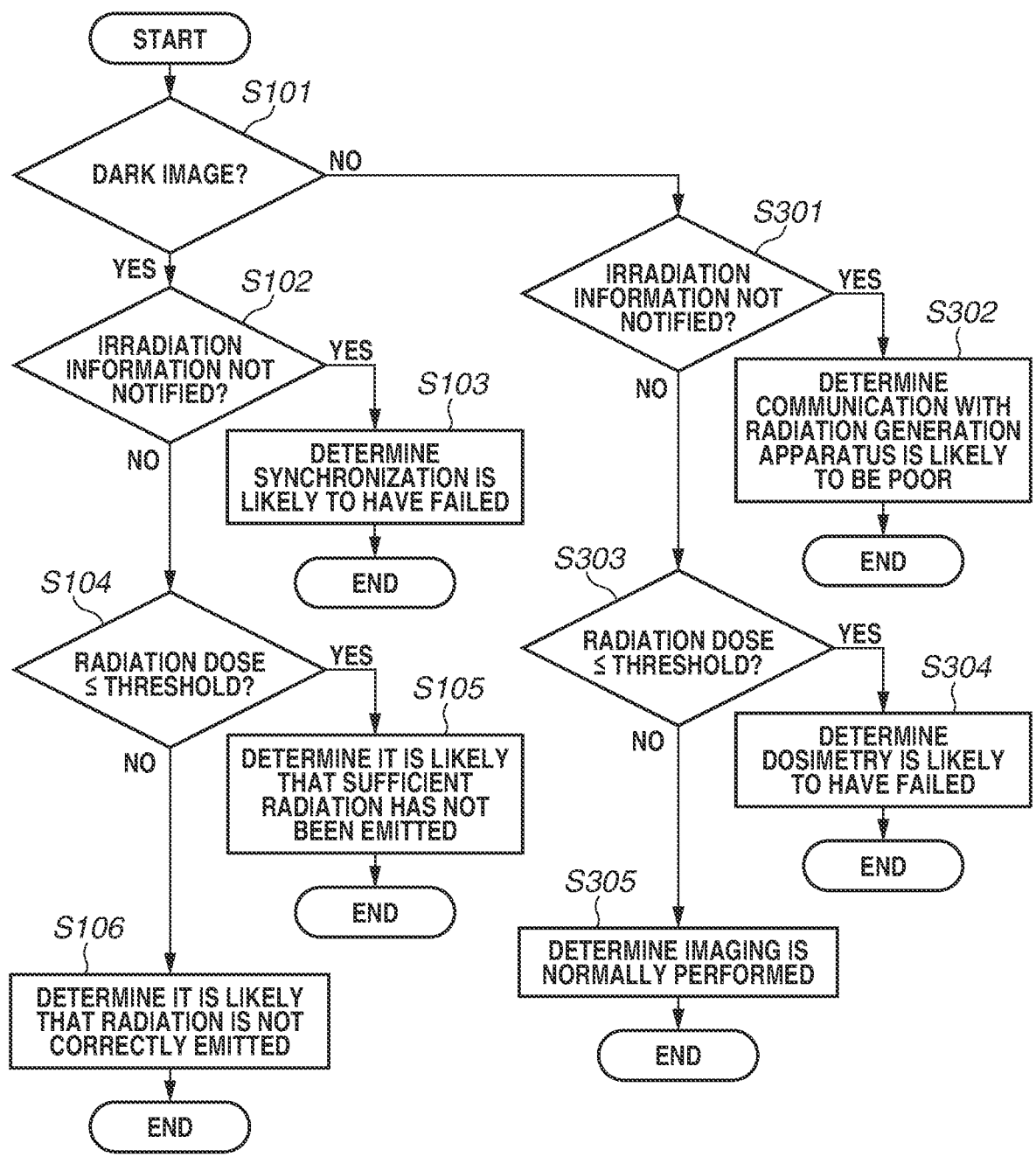
FIG. 10 is a flowchart illustrating dark image factor determination according to a third exemplary embodiment.

FIG. 10 is a flowchart illustrating dark image factor determination according to the present exemplary embodiment.

If it is determined that a transferred image is not a dark image in step S101, step S301 is performed.

In step S301, a dark image factor determination unit 206 acquires a radiation dose value held by an irradiation information acquisition unit 205, and determines whether the radiation dose value is null information. If the radiation dose value is null information (YES in step S301), the processing proceeds to step S302. In step S302, the dark image factor determination unit 206 determines that communication between a control apparatus 100 and a radiation generation apparatus 120 is likely to be poor, and displays the result on a UI display device. On the other hand, if the radiation dose value is not null information (NO in step S301), the processing proceeds to step S303.

In step S303, the dark image factor determination unit 206 determines whether the radiation dose value held by the irradiation information acquisition unit 205 is less than or equal to a threshold. If the radiation dose value is less than or equal to the threshold (YES in step S303), the processing proceeds to step S304. In step S304, the dark image factor determination unit 206 determines it is likely that dosimetry has not been correctly performed, and displays the result on the UI display device. On the other hand, if the radiation dose value is more than the threshold (NO in step S303), the processing proceeds to step S305. In step S305, the dark image factor determination unit 206 determines that imaging is normally performed, and the determination ends.

The described-above configuration according to the third exemplary embodiment makes it possible to warn an operator that there is a possibility that the radiation imaging system is not normally operating based on the determination result indicating that the image is not the dark image in a dark image determination unit 204 and the irradiation information in the irradiation information acquisition unit 205.

According to the exemplary embodiments of the present disclosure, the operator can recognize a factor in the transfer of a failed image (dark image), and thus can easily perform appropriate imaging in re-imaging.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-188826, filed Nov. 28, 2022, which is hereby incorporated by reference herein in its entirety.

What is claimed is:

1. A radiation imaging system comprising:
a radiation imaging apparatus configured to generate a radiation image based on radiation emitted from a radiation generation apparatus; and
a control apparatus configured to acquire information from the radiation imaging apparatus and the radiation generation apparatus,
wherein the control apparatus includes:
at least one computer-readable storage media; and
at least one processor that is in communication with the at least one computer-readable storage media and that cooperate with the at least one computer-readable storage media to cause the control apparatus to:
determine whether the radiation image acquired from the radiation imaging apparatus is a failed image,
acquire irradiation information from the radiation generation apparatus, and
determine a factor in acquisition of the failed image, based on a determination result and the irradiation information.

2. The radiation imaging system according to claim 1, wherein the failed image is a dark image with an insufficient dose of radiation to the radiation imaging apparatus.

3. The radiation imaging system according to claim 1, wherein the control apparatus further includes a display device configured to display a factor in transfer of the failed image, based on a determination result.

4. The radiation imaging system according to claim 1, wherein information about a radiation dose value is acquired.

5. The radiation imaging system according to claim 1, wherein a radiation dose value null is assigned, in a case where the irradiation information is not acquired from the radiation generation apparatus.

6. The radiation imaging system according to claim 1, wherein the radiation imaging apparatus generates the radiation image in synchronization with the emission of radiation by the radiation generation apparatus, and
wherein success or failure of the synchronization between the radiation generation apparatus and the radiation imaging apparatus is determined.

7. The radiation imaging system according to claim 6, wherein the radiation imaging apparatus performs synchronous communication for generating the radiation image in synchronization with the emission of radiation by the radiation generation apparatus, with the radiation generation apparatus, and
wherein success or failure of the synchronization between the radiation generation apparatus and the radiation imaging apparatus is determined, based on information indicating whether the synchronous communication is completed within a predetermined time.

8. The radiation imaging system according to claim 1, wherein the radiation imaging apparatus transmits a signal indicating an instruction to stop radiation to the radiation generation apparatus, based on a pixel value of a target region set in the radiation imaging apparatus, and a stop condition setting, and
wherein, based on a dose index calculated in the target region of the radiation image acquired from the radiation imaging apparatus, whether the radiation image is the failed image is determined.

9. The radiation imaging system according to claim 1, wherein the control apparatus determines that there is a possibility that the radiation imaging system is not normally operating, based on a determination result indicating that the radiation image is not the failed image is determined, and the irradiation information acquired.

* * * * *